United States Patent
Zhou et al.

(10) Patent No.: US 11,088,937 B1
(45) Date of Patent: Aug. 10, 2021

(54) SYSTEM AND METHOD FOR SYNCHRONIZED ROUTE UPDATE

(71) Applicant: Google LLC, Mountain View, CA (US)

(72) Inventors: Junlan Zhou, Sunnyvale, CA (US); Zhengrong Ji, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 670 days.

(21) Appl. No.: 14/677,054

(22) Filed: Apr. 2, 2015

Related U.S. Application Data (60) Provisional application No. 61/990,222, filed on May 8, 2014.

(51) Int. Cl.
   *H04L 12/751* (2013.01)
   *H04L 12/721* (2013.01)

(52) U.S. Cl.
   CPC .......... *H04L 45/026* (2013.01); *H04L 45/26* (2013.01)

(58) Field of Classification Search
   CPC ..... H04L 45/22; H04L 47/15; H04L 47/2441; H04L 47/746; H04L 47/829; H04L 41/12; H04L 45/02; H04L 43/0882
   See application file for complete search history.

(56) References Cited

U.S. PATENT DOCUMENTS

| | | | | |
|---|---|---|---|---|
| 4,825,206 A | * | 4/1989 | Brice, Jr. .............. | G06F 15/161 340/2.1 |
| 5,265,092 A | * | 11/1993 | Soloway ................. | H04L 45/02 370/238 |
| 5,333,134 A | * | 7/1994 | Ishibashi ............. | H04L 12/5602 370/447 |
| 7,313,089 B2 | * | 12/2007 | Moller ...................... | H04L 1/22 370/219 |
| 7,453,864 B2 | * | 11/2008 | Kennedy ................. | H04L 45/22 370/351 |

(Continued)

FOREIGN PATENT DOCUMENTS

| JP | 2000092542 A | * | 3/2000 | |
|---|---|---|---|---|
| WO | WO-2013023842 A1 | * | 2/2013 | ............ H04W 36/02 |

OTHER PUBLICATIONS

Machine translation of JP 2000-092542. Translated Sep. 22, 2016. 15 printed pages.*

(Continued)

*Primary Examiner* — Hitesh Patel
(74) *Attorney, Agent, or Firm* — Lerner, David, Littenberg, Krumholz & Mentlik, LLP (57) ABSTRACT

Aspects of the present disclosure relate to synchronizing route updates. In one aspect, one or more computing devices, such as a router or a centralized controller, may receive a notification of a planned topology change to the network. The topology change may affect a link between nodes. Further, the one or more computing devices may determine one or more paths associated with the link and determine one or more user nodes associated with each path. The one or more computing devices may send an instruction message associated with the planned topology change to each user node of each path and receive an acknowledgment message in response to the instruction message. Based on the information in the acknowledgement message, the one or more computing devices may determine whether to effect the planned topology change.

17 Claims, 9 Drawing Sheets

(56) References Cited

U.S. PATENT DOCUMENTS

| | | | |
|---|---|---|---|
| 7,593,324 B2* | 9/2009 | Jain | H04L 49/552 370/227 |
| 7,953,027 B2* | 5/2011 | Previdi | H04L 12/1868 370/256 |
| 7,961,638 B2 | 6/2011 | Porat | |
| 8,154,990 B2* | 4/2012 | Kokje | H04L 49/00 370/216 |
| 8,165,083 B2* | 4/2012 | Tani | H04L 1/0007 370/329 |
| 8,391,271 B2 | 3/2013 | Mo et al. | |
| 8,416,812 B2 | 4/2013 | Radulescu | |
| 8,559,389 B2* | 10/2013 | Makabe | H04W 36/0088 370/331 |
| 8,576,703 B2 | 11/2013 | Dholakia et al. | |
| 8,599,822 B2 | 12/2013 | Castagnoli | |
| 8,644,829 B2* | 2/2014 | Islam | H04W 76/06 455/411 |
| 8,666,413 B2* | 3/2014 | Kato | H04W 36/0055 455/422.1 |
| 9,019,943 B2* | 4/2015 | Dwivedi | H04W 76/023 370/338 |
| 9,036,504 B1* | 5/2015 | Miller | H04L 45/04 370/254 |
| 2001/0033548 A1 | 10/2001 | Saleh et al. | |
| 2002/0131362 A1* | 9/2002 | Callon | H04L 45/021 370/216 |
| 2003/0117949 A1* | 6/2003 | Moller | H04L 1/22 370/219 |
| 2003/0152030 A1* | 8/2003 | Hershey | H04L 1/188 370/236 |
| 2004/0218582 A1* | 11/2004 | Kennedy | H04L 45/22 370/351 |
| 2005/0105524 A1* | 5/2005 | Stevens | H04L 45/04 370/389 |
| 2006/0077909 A1* | 4/2006 | Saleh | H04L 41/0803 370/254 |
| 2006/0087963 A1* | 4/2006 | Jain | H04L 49/552 370/217 |
| 2006/0140136 A1* | 6/2006 | Filsfils | H04L 45/02 370/255 |
| 2007/0189193 A1* | 8/2007 | Previdi | H04L 12/1868 370/256 |
| 2007/0270140 A1* | 11/2007 | Islam | H04W 76/06 455/423 |
| 2008/0031236 A1 | 2/2008 | Yang et al. | |
| 2008/0037442 A1* | 2/2008 | Bill | H04L 41/12 370/254 |
| 2008/0304510 A1* | 12/2008 | Qu | H04W 76/064 370/463 |
| 2009/0170515 A1* | 7/2009 | Kato | H04W 36/0055 455/436 |
| 2009/0252065 A1 | 10/2009 | Zhang et al. | |
| 2010/0039982 A1* | 2/2010 | Itagaki | H04W 40/22 370/315 |
| 2010/0040007 A1* | 2/2010 | Itagaki | H04L 47/10 370/329 |
| 2010/0067487 A1* | 3/2010 | Makabe | H04W 36/0088 370/331 |
| 2010/0310253 A1* | 12/2010 | Kokje | H04L 49/00 398/45 |
| 2010/0322187 A1* | 12/2010 | Tani | H04L 1/0007 370/331 |
| 2012/0057577 A1* | 3/2012 | Dwivedi | H04W 76/023 370/338 |
| 2012/0163256 A1* | 6/2012 | Kang | H04L 12/4625 370/310 |
| 2012/0257514 A1 | 10/2012 | Allan et al. | |
| 2015/0029998 A1* | 1/2015 | Sayenko | H04W 36/02 370/331 |
| 2016/0043901 A1* | 2/2016 | Sankar | H04L 41/12 709/226 |

OTHER PUBLICATIONS

"Apache Camel: Graceful Shutdown". Archived Apr. 29, 2013. 5 printed pages Available online: https://web-beta.archive.org/web/20130429150513/http://camel.apache.org/graceful-shutdown.html.*

L41—OSPF Fundamentals, Institute of Computer Technology—Vienna University of Technology, 22 pages, © 2007, <https://www.ict.tuwien.ac.at/Iva/384.081/infobase/P41-OSPF_Fundamentals_v4-5.pdf>.

Wikipedia, Rounding Table, printed Sep. 5, 2014, 4 pages, <http://en.wikipedia.org/wiki/Routing_table>.

Aweya, James, "IP Router Architectures: An Overview", Nortel Networks Canada, 1999, 48 pages.

"Open Shortest Path First (OSPF) Conformance and Performance Testing", IXIA, 2004, 26 pages, <http://www.ixiacom.com/pdfs/library/white_papers/ospf.pdf>.

* cited by examiner

SYSTEM AND METHOD FOR SYNCHRONIZED ROUTE UPDATE

CROSS-REFERENCE TO RELATED APPLICATIONS

The present application claims the benefit of the filing date of U.S. Provisional Patent Application No. 61/990,222 filed May 8, 2014, the disclosure of which is hereby incorporated herein by reference.

BACKGROUND

Over time, computer networks, such as internet protocol (IP) networks, may undergo various topology changes. For example, one or more existing links of a network may be shutdown, or one or more new links may be activated on the network. With traditional routing protocols in IP networks, routers detect a topology change only after the change has occurred. Subsequently, the routers may communicate the change to the rest of the network. As communications regarding the topology change are gradually broadcast across the network, numerous upstream and downstream routers may be subjected to inconsistent and potentially outdated snapshots of the network's topology. As a result, traffic loss may occur, and ultimately diminish network throughput.

BRIEF SUMMARY

The present disclosure provides for synchronized route updates among network components of a planned topology change in order to prevent traffic loss. In one aspect, a method comprises receiving, with one or more computing devices, a modification of a planned topology change. The planned topology change affecting a link between nodes. Further, the method comprises determining, with the one or more computing devices, one or more paths that include the link and determining, with the one or more computing devices, one or more user nodes associated with each of the one or more paths. Additionally, the method comprises sending, with the one or more computing devices, an instruction message associated with the planned topology change to the one or more user nodes and receiving, with the one or more computing devices, an acknowledgment message in response to the instruction message. Based on information in the acknowledgement message, the method comprises determining, with the one or more computing devices, whether to effect the planned topology change.

Another aspect of the disclosure provides a system comprising memory, and one or more computing devices, each of the one or more computing devices having one or more processors coupled to the memory. The one or more computing devices are configured to receive a notification of a planned topology change. The planned topology change affecting a link between nodes. Further, the one or more computing devices is configured to determine one or more paths that include the link and determine one or more user nodes associated with each of the one or more paths. Additionally, the one or more computing devices send an instruction message associated with the planned topology change to the one or more user nodes and receive an acknowledgement message in response to the instruction message. Based on information in the acknowledgement message, the one or more computing devices are configured to determine whether to effect the planned topology change.

A further aspect of the disclosure provides a non-transitory, tangible computer readable medium on which instructions are stored, and the instructions when executed by one or more computing devices perform a method, the method comprises receiving a notification of a planned topology change. The planned topology change affecting a link between nodes. Further the method comprises determining one or more paths that include the link and determining one or more user nodes associated with each of the one or more paths. Additionally, the method comprises sending an instruction message associated with the planned topology change to the one or more user nodes and receiving an acknowledgement message in response to the instruction message. Based on information in the acknowledgement message, determining whether to effect the planned topology change.

DETAILED DESCRIPTION

The present disclosure is directed to a system and method for tracking router connection dependencies for traffic paths in a network and synchronizing route updates among the routers based on the tracked dependencies. For example, an existing link on the network may be shut down, or a new link may be added to the network. By proactively synchronizing router information, network traffic that may be affected by a change to the network's topology may be moved to other available paths before the change occurs. In that regard, synchronized route updates eliminate traffic loss as a result of changes to the network's topology. The technology in accordance with aspects of the disclosure may be compatible with any distributed routing algorithm using shortest or non-shortest paths.

Each router of a network may maintain its own path table(s), which comprises information about one or more traffic paths, a list of user nodes for each traffic path, and corresponding flow rules assigned to the one or more traffic paths.

In one aspect, a router may update its path table when it sets up a new path, or when it processes a request to add a new path from an immediate upstream router. If the new path already exists in the path table, the router may add the traffic source to the list of user nodes and a corresponding flow rule. Otherwise, the router may create and add an entry to the path table for the new path. Meanwhile, the router may send a message that comprises a request that the immediate next-hop router add the new path to its path table. The same message may also comprise an indication that the router has already added the new path to its table. This process may continue along the subsequent routers until either an intermediate route already has an entry for the exact segment of the new path, or the message to add the new path reaches the router immediately preceding the new path's final destination.

In another aspect, a router may update its path table when it shuts down an existing path, or when it receives a message to delete an existing path from one of its immediate neighbors. For example, the delete message may inform the router that the sending neighbor-router no longer has any traffic to forward to the path being deleted. In either instance above, the router removes itself or its immediate neighbor from the list of user nodes associated with the path. If the path has no active user nodes, its corresponding entry may be removed entirely from the router's path table, and subsequently generates a message to delete the path to its next-hop router. This process continues until no more path update messages are generated.

As described above, each router in a network may use its path table(s) to synchronize route updates when an existing link will be shut down, or when a new link will be added to the network. In one example, a router may receive a notification that a link it is attached to will be shut down. Upon receiving this notification, the router may look up its path table to determine the set of active paths covering the link and corresponding user nodes of these paths. For each path from the set, the router may send a message to each user node requesting the user node to delete the path from the user's table and wait for an acknowledgement message from the user node.

In one example, the acknowledgement message may include information to indicate that a user node still has traffic to send over the link. When the user node still has traffic to send over the link, the router may wait a predefined period of time, e.g., 10 seconds, before sending another instruction message or otherwise effect the topology change. In another example, the acknowledgement message may indicate that the user node has no traffic to send over the link or that it has completed the router's request to delete the path. After receiving acknowledgements from the user nodes, the router effects the topology change, such as removing the path from its path table and associated flow rules, as noted above, or migrating one or more traffic paths affected by the topology change.

In another example, a router detects that a new link is added the network and may set up a new path using the link to forward traffic to a particular destination. Before adding any flow rules to its path table, the router sends a message to the next-hop router requesting the addition of the new path between that router and the destination. The router subsequently waits for an acknowledgment message from the next-hop router. If such path has already been set up by the next-hop router as may be indicated by its path table, it may reply to the original router with an acknowledgment immediately. Otherwise, the next-hop router sends a message to add path to its next-hop router for path setup.

In a further example, the transmission and receipt of messages between the routers and their corresponding user nodes described above may be managed by one or more centralized controllers. Moreover, the centralized controller may also maintain and manage the path tables of the routers.

Figure 1:
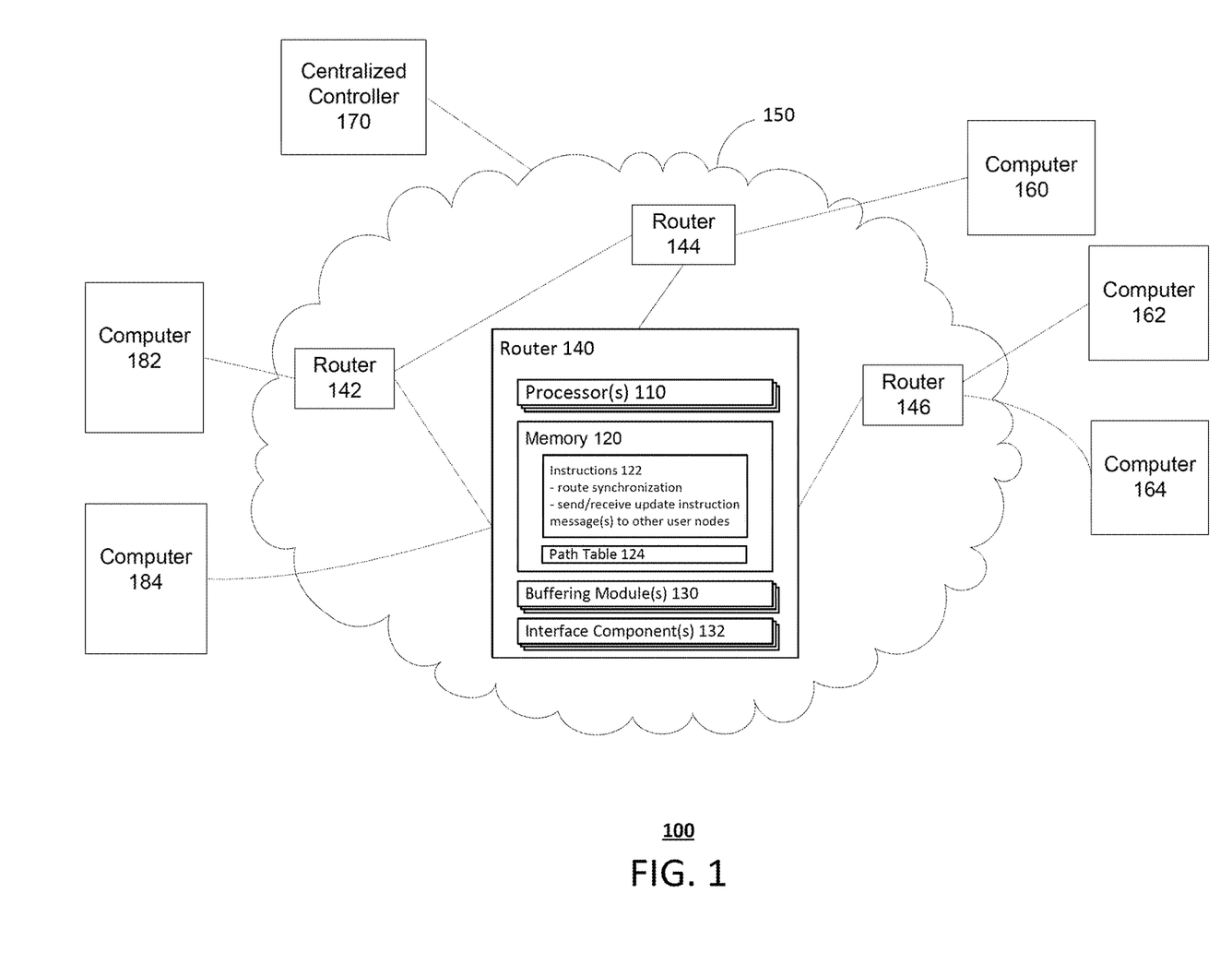
FIG. 1 is a system diagram in accordance with aspects of the disclosure.

FIG. 1 illustrates an example network 150 that joins a plurality of computing devices, e.g., computers 160, 162, 164, 182, 184, as well as a centralized controller 170. The network 150 may be, for example, a datacenter or any other collection of routers or other switching devices joining two or more host devices. The network 150 includes a plurality of routers 140, 142, 144, 146. Each router may include one or more processors 110 and a memory 120 coupled to the one or more processors 110. Each router may further include one or more buffering modules 130 for managing outgoing/incoming data packets, and one or more component interfaces 132 to accommodate outgoing/incoming data through the network 150.

The centralized controller 170 is also connected to network 150, which may include one or more servers having a plurality of computing devices, e.g., a load balanced server farm, that exchange information with different nodes of a network for the purpose of receiving, processing and transmitting data to and from other computing devices in the network 150, and other connected networks (not shown). The centralized controller 170 may store and process information about the topology of the network 150, or individual topologies of other various networks that may be connected to network 150.

The computers 160, 162, 164, 182, 184 may be any of a variety of computing devices, including servers in a datacenter, personal digital assistants (PDAs), laptops, tablet PCs, netbooks, PCs, etc. These devices may be connected to the network 150 via a wired connection, such as through a modem, or wirelessly, such as through an access point in communication with one of the routers 140-146. Although only a few computers are depicted in FIG. 1, it should be appreciated that the system can include a large number of connected computers, with each different computer being at a different node of the network 150.

The network 150, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

In addition, the network components depicted within network 150 of FIG. 1 are not limited to only routers. For example, the routers 140-146 depicted in network 150 may be any networking component or device capable of receiving and forwarding data packets to appropriate destinations of a computer network, such as a network switch, a hub, network interface controller (NIC), etc.

As noted above, each router may have a processor and a memory, such as memory 120 of the router 140, which stores instructions 122, for example, for receiving and sending instruction messages regarding topology changes to other user nodes of the network 150. The memory 120 includes at least a path table 124 to maintain and keep track of various routing paths, corresponding users of those paths, as well as associated flow rules. Moreover, each router may also include one or more buffering modules 130 for storing and managing outgoing/incoming data packets, and one or more interface components to accommodate the transmission and reception of the data packets through the network 150.

The one or more processors 110 of router 140 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of router 140 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a casing different from that of router 140. Accordingly, references to a processor or computing device will be understood to include references to a collection of processors or computing devices or memories that may or may not operate in parallel.

The memory 120 of router 140 stores information accessible by the one or more processors 110, including data (not shown), instructions 122 that may be executed or otherwise used by the one or more processors 110, and path table 124. The memory 120 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data may be retrieved, stored or modified by the one or more processors 110 in accordance with the instructions 122. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 122 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

As discussed in more detail below with regard to FIG. 2, path table 124 may contain information regarding traffic paths associated with router 140, user nodes utilizing the traffic paths, as well as corresponding flow rules, e.g., destination IP addresses. The path table may further contain information about the network's topology, the router's destination(s) and distances associated with those destination(s).

Router 140 may have all of the components normally used in connection with a computing device such as the processor and memory described above. As described above, the components and/or devices depicted in FIG. 1 are not limited to routers. These devices may be any device capable of receiving and forwarding data packets to appropriate destinations of a computer network. In that regard, the routers shown in FIG. 1 may have one or more buffering modules, e.g., buffering module(s) 130, to buffer data packets that may be waiting to be transmitted to a particular destination, or may be waiting to be processed by the one or more processors. Moreover, the routers may also have one or more interface components, e.g., interface component(s) 132, to accommodate outing data and incoming data packets.

The one or more buffering modules 130 may be configured to manage a plurality of data packet queues, schedule numerous packet transmissions and also store data packets in parallel with memory 120 to alleviate data bottle-necking. For example, the one or more buffering modules 130 may assist in managing data packet queues to prevent packet congestion and/or implement packet dropping techniques, such as Tail Drop, Drop-From-Front, Random Early Detection (RED), etc. In addition, the buffering modules 130 may be involved in scheduling transmission policies based on various techniques, such as strict priority, weighted round-robin (WRR), weighted fair queuing (WFQ), etc. The one or more interface components 132 may be configured to receive incoming data packets and transmit outgoing data packets. An example of an interface component may be an interface card that has one or more ports and perform inbound and outbound packet forwarding.

As shown in the network 150 of FIG. 1, router 140 may be capable of communicating with other routers 142, 144, 146 as well as computers 160, 162, 164, 182, 184. For example, router 140 may be in communication with routers 142, 144 and 146 in order to facilitate network communication in accordance with the data, the instructions 122, and path table 124 stored in memory 120. Similarly, router 140 may be in communication with computers 160, 162, 164, 182 or 184 either directly or via the routers 142, 144, and 146. Although the routers in network 150 are shown to each have one or more processors, the processing may alternatively be done by one or more processors residing in the centralized controller 170.

Figure 2:
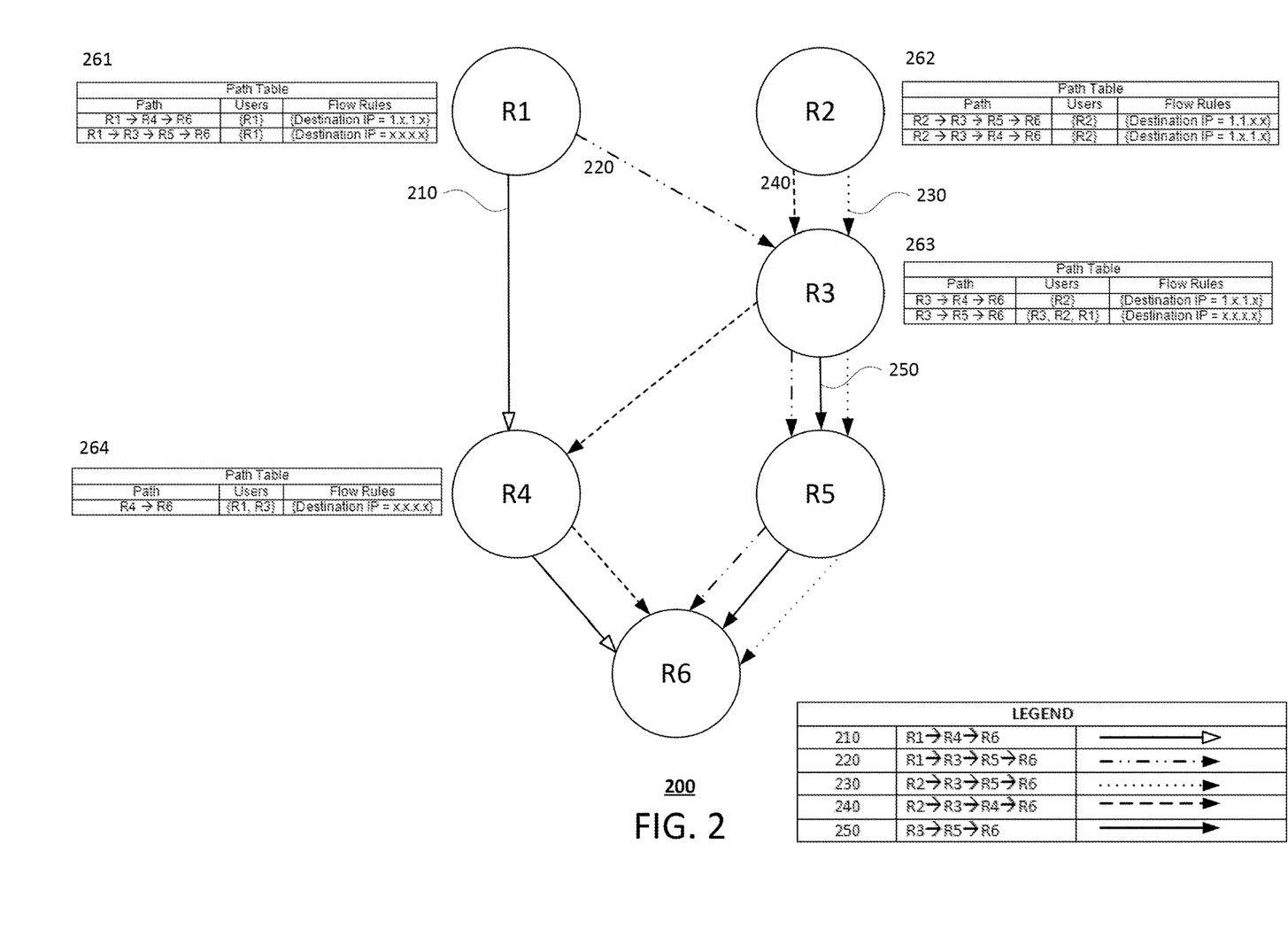
FIG. 2 is illustrates an example of flows in a network in accordance with aspects of the disclosure.

FIG. 2 is a diagram of a network 200, which includes six different routers R1-R6. It should be understood that additional routers may be included in network 200 and this example is provided for illustrative purposes only. As shown, each router is associated with a path table, such as path tables 261-264. For example, path table 261 is associated with router R1, path table 262 is associated with router R2, path table 263 is associated with router R3, and path table 264 is associated with router R4. Each path table may include one or more traffic paths, user nodes that are associated with the traffic paths, and flow rules for the traffic paths. A traffic path is a directed sequence of routers, e.g., R1, R4, R6, such that network traffic is routed along the sequence of routers until the traffic reaches its destination. The traffic path may be represented by "→" to denote the direction of the sequence. In addition, an end-to-end traffic path may be a traffic path such that its first and last routers in the path are the exact source and destination of the network traffic, respectively. A path segment is a consecutive subsequence of a traffic path. For instance, five end-to-end paths depicted by arrows 210, 220, 230, 240 and 250, are illustrated between the different routers R1-R6.

Routers R1-R6 may be able to keep track of connection dependencies among themselves, and use this information in their respective path tables to alert each other of expected topology changes to network 200 before they occur. Accordingly, this synchronization process among all the path tables of routers R1-R6 may eliminate traffic loss on the network 200. In this example, the path table of R1 includes two different traffic paths to R6. The first traffic path includes router sequence R1, R4, R6, and serves destination IP address 1.x.1.x, depicted by arrow 210. The second traffic path includes router sequence R1, R3, R5, R6, and serves traffic to destination IP address x.x.x.x, depicted by arrow 220. Moreover, the traffic path should not contain any loops.

Each router maintains a path table, which may include information about one or more traffic paths, a list of user nodes for each traffic path, and corresponding flow rules assigned to the one or more traffic paths. A router may be considered a "user" of a path stored in a path table for a given router if the user router is the originator of the network traffic, or if the given router received traffic directly from the user router. For example, in path table 261 for router R1, R1 is considered the only user node of path R1→R4→R6 and R1→R3→R5→R6, because it is the originator of the traffic. As another example, in path table 264 for router R4, R1 and R3 are both considered user nodes of the path R4→R6 because R4 receives traffic directly from R1 and R3 to be forwarded along this path. A router may be considered a user node of a traffic path when there is an end-to-end network traffic originating from that router. A neighboring router may also be considered a user node of the traffic path when it forwards network traffic over to the router. In this regard, each router may be able to keep track of connection dependencies to use that information to adjust the network topology without traffic loss and to reflect various topology changes to the network.

As shown, a router's path table may be organized in a format comprising columns and rows. And each individual cell of the path table may be considered an entry. For example, the traffic paths described above with regard to R1 are listed under the "Path" column in path table 261. For each of R1's traffic paths, R1 is the only associated user node because it is the only router using those particular routing sequences. Therefore, R1 is listed as such under the "Users" column in the path table 261. Additionally, the respective destination IP addresses are listed under the "Flow Rules" column in path table 261. In this regard, R1 may be able to keep track of the dependencies of its neighboring nodes and inform them of planned topology changes that may ultimately affect their connection to R1. Conversely, other routers with information about an impending topology change affecting R1 may communicate this information to R1. It should be understood that the format of each path table may vary. For example, a path table can include additional information or can identify relationships among routers or traffic dependencies using other information.

The path table 262 for R2 includes paths to R6. The first traffic path comprises routing sequence R2, R3, R5, R6, and serves traffic to destination IP address 1.1.x.x, which is depicted by arrow 230. As indicated in its path table, R2 is the only user node for this particular path. The second traffic path comprises routing sequence R2, R3, R4, R6, and serves traffic to destination IP address 1.x.1.x, which is depicted by arrow 240. Again, R2 is the only user node for this path as shown in path table 262.

Similar to path tables 261 and 262, path table 263 includes two different traffic paths to R6 in network 200. As depicted in path table 263 of R3, however, there are multiple user nodes, other than R3, that depend on these paths. By way of example only, the first path comprises routing sequence R3, R4, R6, and serves destination IP address 1.x.1.x, which is depicted again by arrow 240. Here, R2 is the only user node since it is an upstream neighbor, which forwards network traffic to R3 and ultimately to R6 along the same dashed path. Accordingly, R2 is listed an entry in the "Users" column of path table 263 in the row corresponding to path R3→R4→R6. The second path comprises routing sequence R3, R5, R6, and serves destination IP address x.x.x.x. For this path, R1, R2 and R3 are all user nodes and entered in path table 263 as such. R1 is a user node since it is an upstream neighbor, which forwards network traffic to R3 and then to R6 along the path of arrow 220. Similarly, R2 is a user node because it is an upstream neighbor, which also forwards network traffic to R3 and eventually to R6 along the path of arrow 230. Further, R3 is also a user node of the path because there is an end-to-end traffic path originating from R3 to R6, as illustrated by the arrow 250.

In another example, R4 establishes a traffic path between itself and R6 in network 200. The routing sequence for the path is R4 to R6 and serves destination IP address x.x.x.x. As shown in path table 264 corresponding to R4, R1 and R3 are the only user nodes utilizing this traffic path. R1 is a user node because it is an upstream neighbor, which forwards network traffic to R4 and then to R6 along the path of arrow 210. Moreover, R5 may have a path table (not shown) that is similar to the path tables of R1-R4 and R6 in accordance with aspects of the present disclosure.

Each path table associated with the one or more routers of a network may be updated whenever necessary. For example, path tables may be updated every 5 seconds, 15 seconds, 1 minute, etc. The updates may also be based on a triggering event, such as a path shutdown. Moreover, the updates may be performed by the routers themselves, or may be performed by a centralized controller, such as the centralized controller 170 depicted in FIG. 1.

As described above, the tables of routers R1-R6 may be able to keep track of connection dependencies for all possible traffic paths. Based on the connection dependencies, the routers may alert each other of expected topology changes to network 300 before they occur and update their path tables according. In this regard, this synchronization process ensures that a path is shut down only after all of its traffic has been migrated to other available paths, and that traffic is moved to a new path only when all path tables of the routers associated with the new path are updated.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 3:
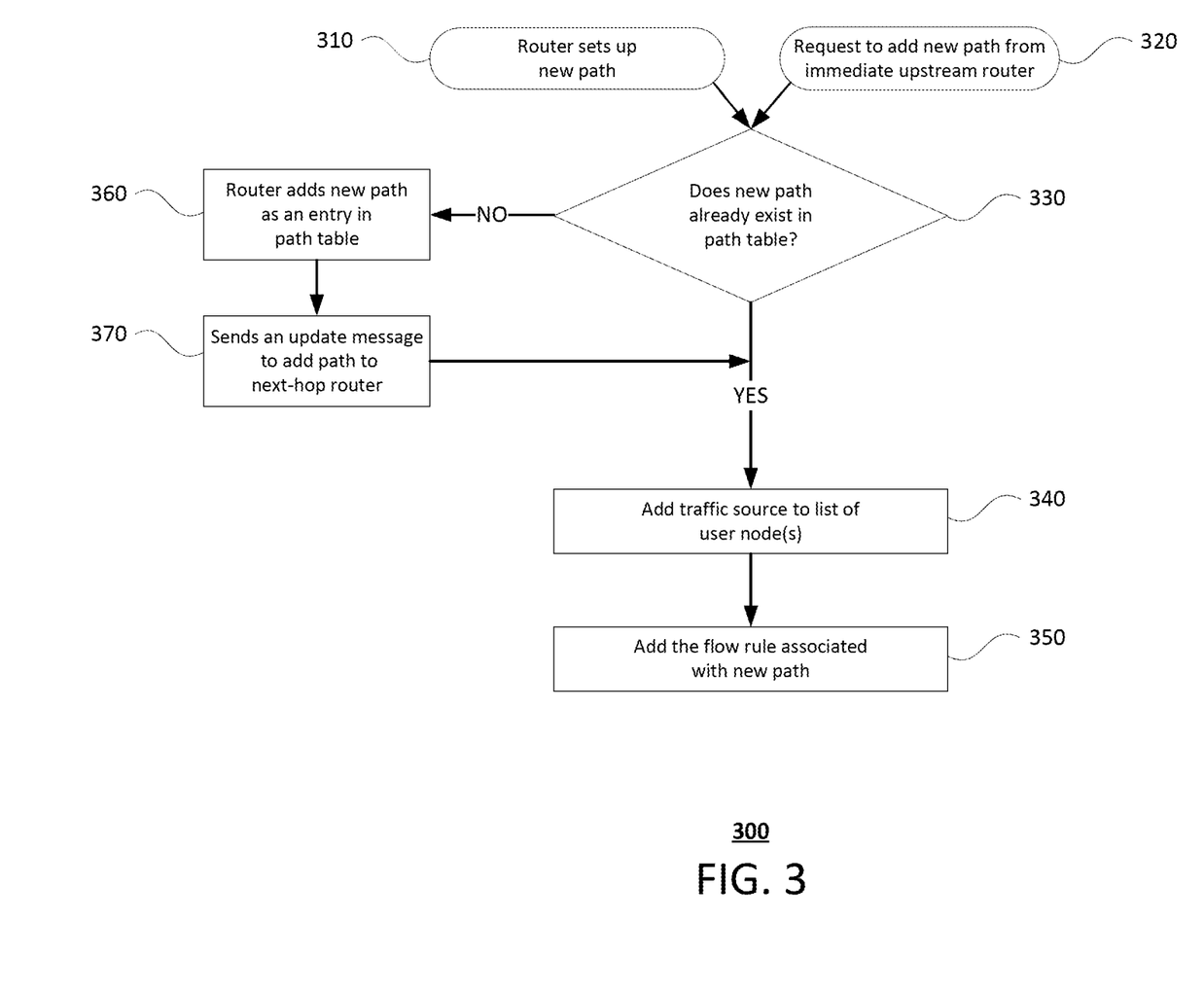
FIG. 3 is an example flow diagram of updating a path table during traffic path setup in accordance with aspects of the disclosure.

In one example, one or more routers of a network may update its path table when a new path is being added to the network. FIG. 3 is an example flow diagram 300 of updating a path table during network path setup in accordance with aspects of the disclosure. In this example, a router, initiating on its own, may set up a new traffic path at block 310, or the router may receive a request from an immediate upstream router to add the new path at block 320. In either instance, a determination is made, at block 330, regarding whether the new traffic path already exists as an entry in its path table. If it is determined that the new path already exists in the router's path table at block 330, then the router adds the traffic source, e.g., the immediate upstream neighbor, to its list of user nodes at block 340. At block 350, the router also adds to its path table a flow rule associated with the traffic source to forward network traffic to the new path.

However, if a determination is made that the new path does not exist in its path table at block 330, then the router adds the new path as a new entry in its path table at block 360. After the addition of the new path in its path table, the router sends an update message to a next-hop router, e.g., immediate downstream router, to add the new traffic path in its path table at block 370. In addition, the router may then add the traffic source to the list of user nodes at block 340 and the associated flow rule at block 350. The aspects described above may be repeated until all relevant downstream routers update their path tables.

Figure 4:
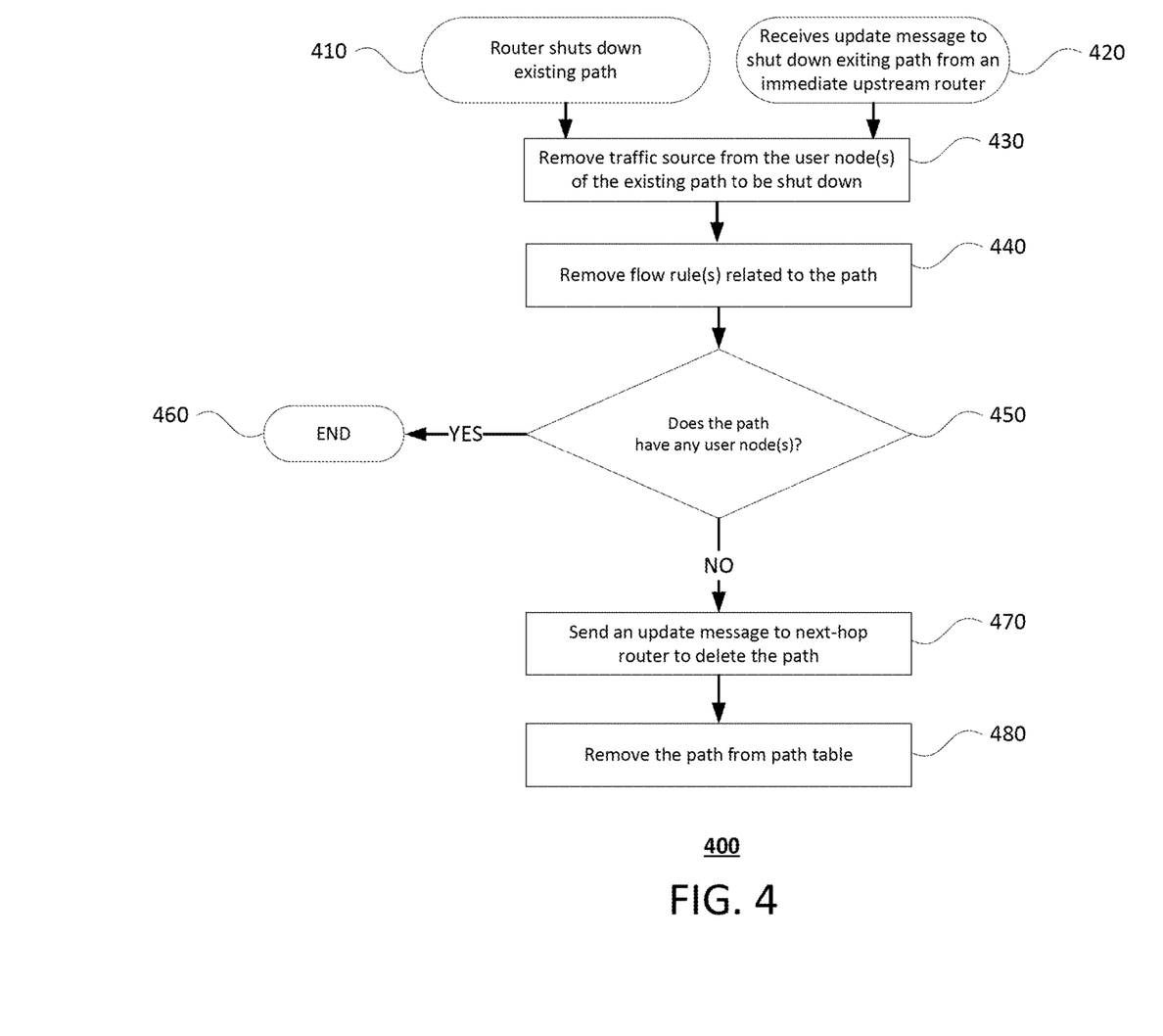
FIG. 4 is an example flow diagram of updating a path table during traffic path shutdown in accordance with aspects of the disclosure.

FIG. 4 is an example flow diagram 400 of updating a path table during network path shutdown in accordance with aspects of the disclosure. By way of example only, a router may shut down an existing path on its own at block 410, or the router may receive an update message to shut down an existing path from an immediate upstream router at block 420. The update message that the router may receive informs the router that its upstream neighbor no long has any forwarding traffic. At block 430, the router removes the traffic source from the one or more user nodes of the existing path to be shut down. At block 440, the router removes any flow rules, e.g., destination IP address, related to the existing path to be shut down. At block 450, a determination is made as to whether the existing path has any user nodes. For instance, this determination may be made by looking up the "Users" column in the router's path table, or alternatively, may be made by the centralized controller 170 depicted in FIG. 1. If the existing path has one or more user nodes, then the router ends the updating process at block 460.

Otherwise, if a determination is made at block 450 that the existing path does not have any user nodes, the router sends an update message to the next-hop router informing it to delete the existing path from its path table at block 470. At block 480, the router removes the existing path from its path table. The above-described aspects of flow diagram 400 may continue from one downstream router to the next until no more path update messages need to be generated, e.g., when a downstream router has at least one active user node on a consecutive subsequence of the existing path originating from the downstream router, or the path update message reaches a router immediately preceding the final destination of the existing path.

Figure 5:
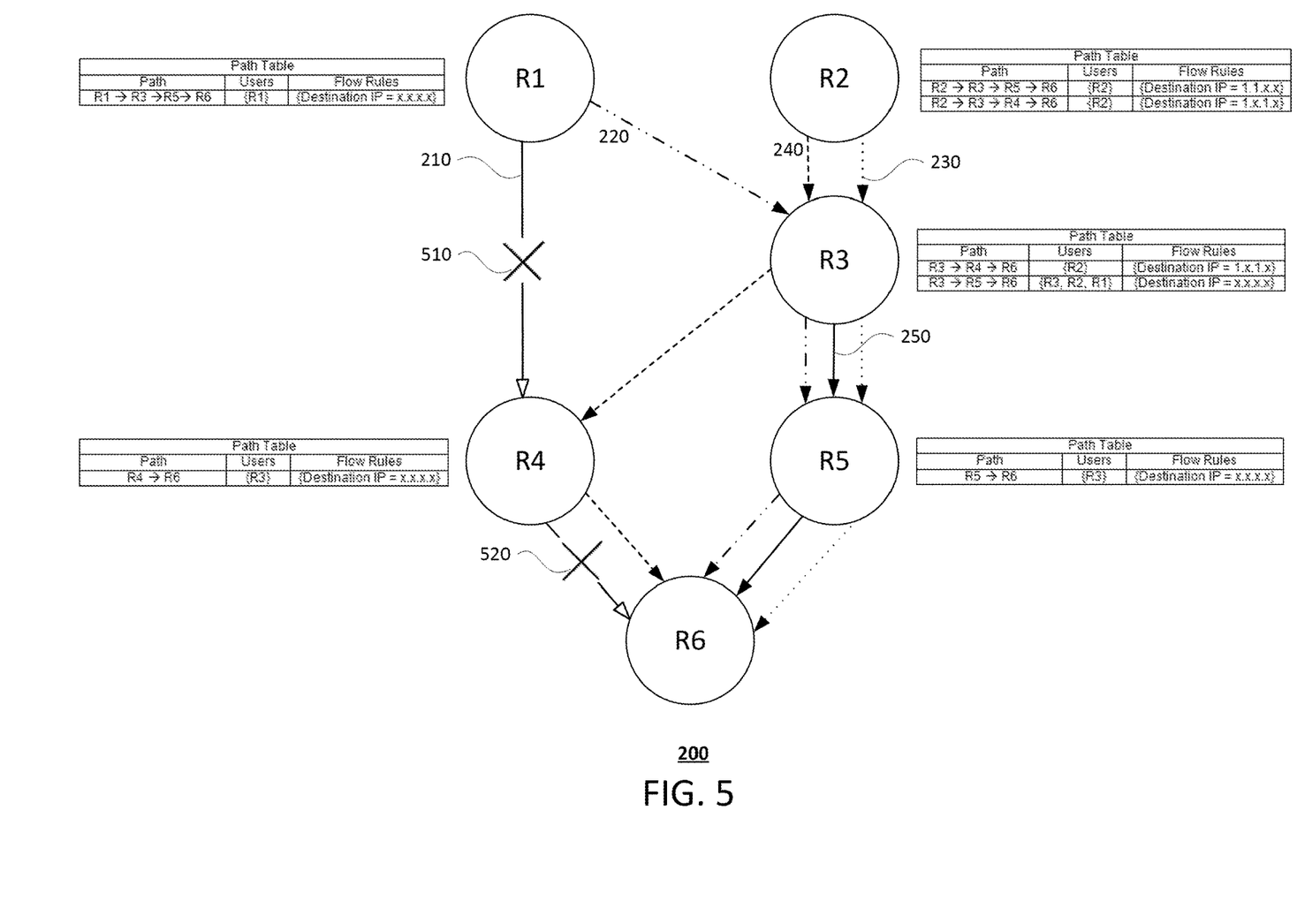
FIG. 5 illustrates an example of link shutdown in the network of FIG. 3 in accordance with aspects of the disclosure.

Before a network path is shutdown, one or more routers of a network may update their path table and migrate all traffic that could be affected by the shutdown event to other available paths of the network. FIG. 5 illustrates the routers in the network 200 updating their respective path tables during path shutdown. For instance, the link between R1 and R4 may be shut down by shutdown event 510. Similarly, the link between R4 and R6 may be shut down by shutdown event 520. Accordingly, the network traffic on path R1→R4→R6 may need to be moved to other available paths of the network.

In one instance, shutdown events 510 or 520 may occur due to traffic inactivity between R1 and R4 and R4 and R6, respectively. Thus, routers R1 and R4 may remove themselves from the paths planned to be shut down and also inform neighboring routers of the impending shutdown events. Before sending an update message to its next-hop router, R1 removes itself from traffic path R1→R4→R6 because it is the traffic source of the path. Similarly, R1 also removes any flow rules associated with the removed traffic path, which is destination IP address 1.x.1.x. Subsequently, a determination is made as to whether there are any active user nodes associated with path segment R4→R6. This determination may be made by the router itself based on its path table, or it may be received from the centralized controller described above with respect to FIG. 1. Here, R4 is a user node of traffic path segment R4→R6. Thus, R1 sends R4 an update message to announce R1's deletion of the path segment R4→R6. Finally, traffic path R1→R4→R6 is removed from path table 261, as depicted in FIG. 5. In this regard, from R1's point of view, the process of updating its path table is complete.

However, from R4's point of view, the process of updating its path table begins. Upon receiving the update message from R1, R4 removes R1 from the list of users nodes associated with traffic path segment R4→R6. R4 also removes any flow rules associated with the path. However, as path segment R4→R6 is still relied upon and needed by R3, R4 now terminates the updating process without removing the R4→R6 entry from its path table. Compared to the path table 264 depicted in FIG. 2, the only entry removed from path table 264 in FIG. 5 is user node R1.

According to one example, path table updates may be synchronized among the one or more routers. In this regard, the network topology change may take place only after network traffic paths that may be affected by the change are migrated to other available network path(s) and also after all relevant path tables have been updated.

Figure 6:
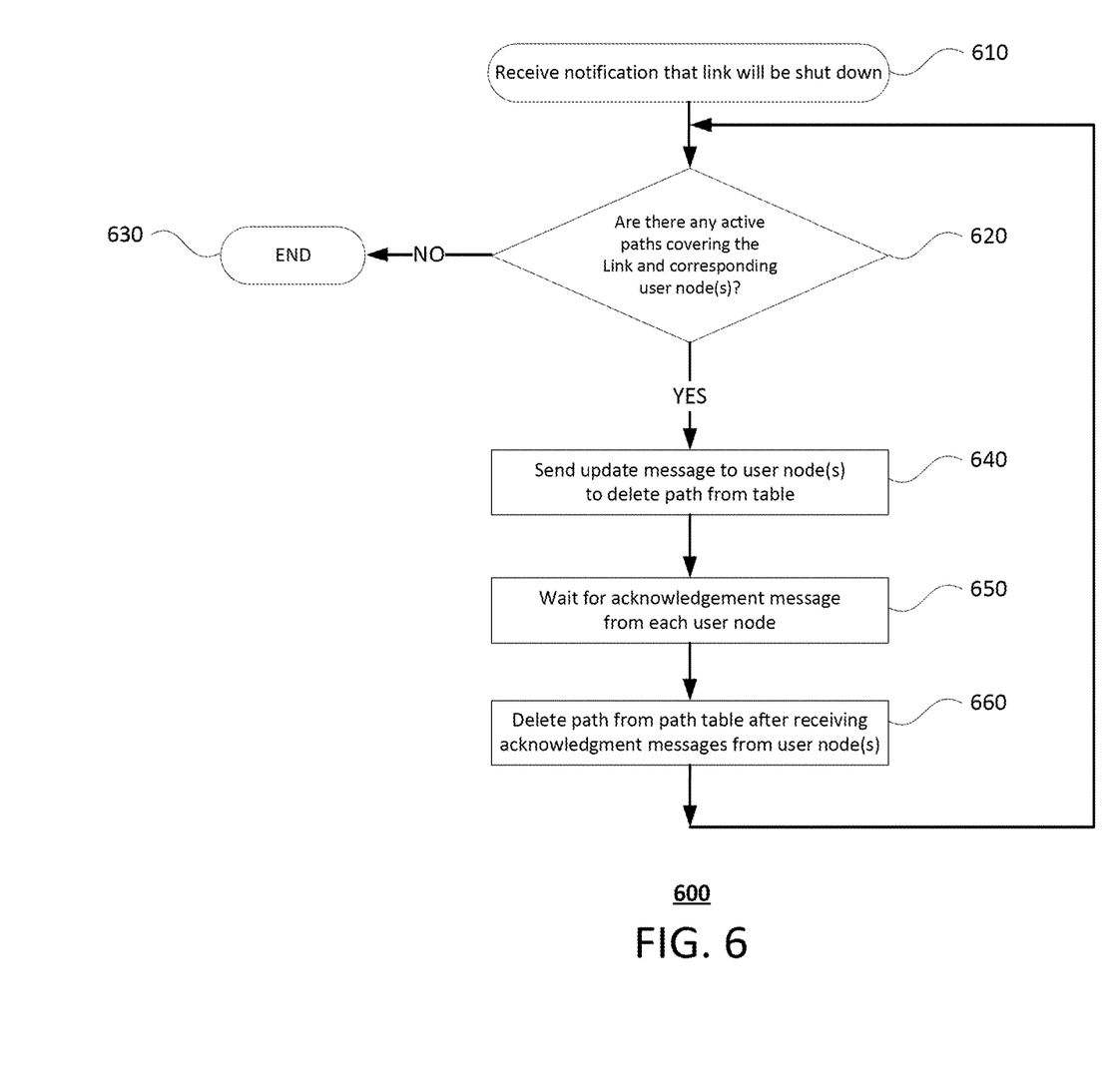
FIG. 6 is an example flow diagram of a synchronized route update during link shutdown in accordance with aspects of the disclosure.

By way of example only, one or more routers attached to a link may be notified that the link is going to be shut down. In this regard, each router may shut down the link on its own. FIG. 6 is an example flow diagram 600 of a synchronized route update during link shutdown in accordance with aspects of the disclosure. For this example, only one of the relevant routers will be used to describe the synchronized route update process. Upon receiving notification that the link will be shut down at block 610, the router connected to the link will look up its path table to determine whether there are any active traffic paths covering the link and whether there are any corresponding user nodes for these paths at block 620. If there are no active paths and corresponding users, the synchronized route update process ends at block 630.

However, if the router determines that there are active path(s) and corresponding users for each of those paths, then the router sends an update message to each user node of each identified traffic path requesting each user to delete the traffic path it is associated with from its path table.

At block 650, the router waits for acknowledgement messages from each user node indicating that it has deleted the path from its path table. After the router receives an acknowledgment message from each user node, the router deletes the traffic path from its path table at block 660. However, it is not until after, and only after, all the acknowledgment messages are received that the router effects the planned topology change, e.g., removes the traffic path associated with the link shutdown.

Figure 7:
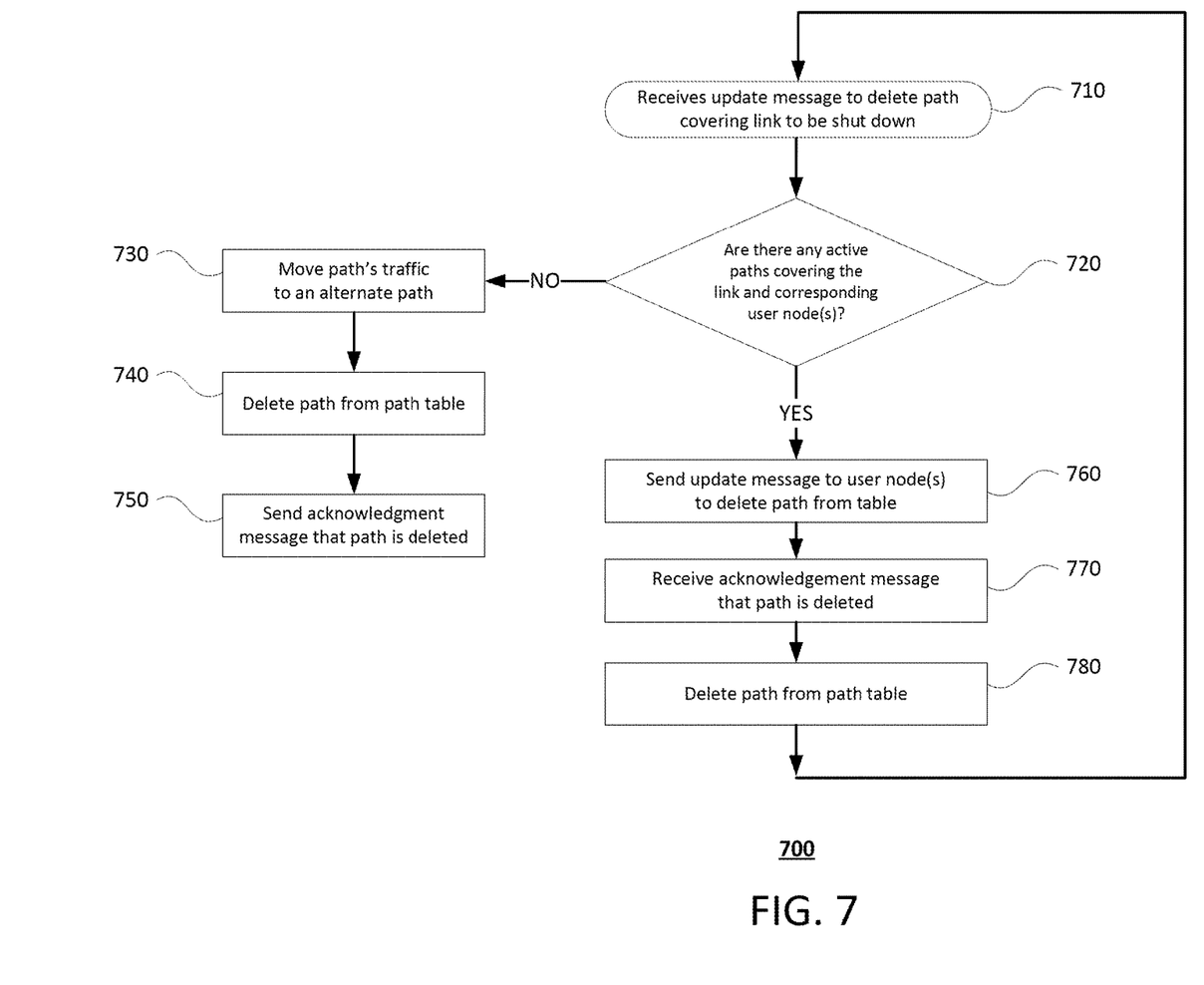
FIG. 7 is an example flow diagram of a synchronized route update during link shutdown in accordance with aspects of the disclosure.

FIG. 7 is an example flow diagram 700 of the synchronized route update from the perspective of a user node of the path covering the link being shut down in FIG. 6. At block 710, the user node, such as a router, receives an update message to delete the network path covering the link that is being shut down. At block 720, the router determines whether there are any active traffic paths covering the link and any corresponding user nodes of the traffic paths. If there are no active traffic paths and no corresponding user nodes, the router moves the traffic on the path to be deleted to an alternate network path at block 730. At block 740, the router then deletes the traffic path from its path table, and at block 750, sends an acknowledgment message to the original requesting router from block 710 that the path has been deleted.

If, however, the router determines that there are active traffic paths covering the link and corresponding user nodes, it sends an update message to each of the user nodes requesting that it delete the path from its path table at block 760. Before the router deletes the traffic path from its own path table, it waits to receive an acknowledgment message from each of the user nodes that the path was deleted at block 770.

Once all the acknowledgement messages are received, the router then deletes the path from its own path table at block 780. Accordingly, an upstream router does not remove traffic path(s) and associated flow rules until it receives an acknowledgement message from each of the one or more downstream routers that it has moved the affected network traffic to an alternate path and that it has updated its path table by the deleting the path. In this regard, components of the network prevent network traffic loss by preemptively rerouting affected traffic before a shutdown event occurs.

Figure 8:
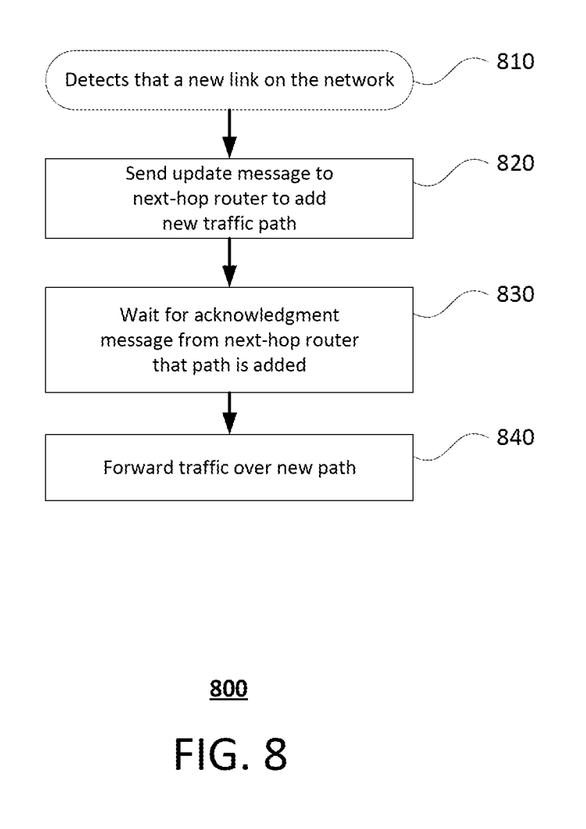
FIG. 8 is an example flow diagram of a synchronized route update during link activation in accordance with aspects of the disclosure.

FIG. 8 is an example flow diagram 800 of a synchronized route update during link activation in accordance with aspects of the disclosure. In this example, a router may detect that a new link has been added to the network at block 810 and attempt to set up a new traffic path using the detected link to forward traffic to a particular destination. Before adding any flow rules associated with the new path, the router sends an update message to its next-hop router requesting it to add the new path to its path table at block 820.

The update message requesting the addition of the new path may be an instruction for the next-hop router to set up a path segment between itself and the router's destination such that the router may be able to start forwarding traffic on the new path. At block 830, the router waits until it receives an acknowledgement message from the next-hop router indicating that the new path has been added. Once the router receives the acknowledgment message from the next-hop router, it may start forwarding traffic over the new path at block 840.

Figure 9:
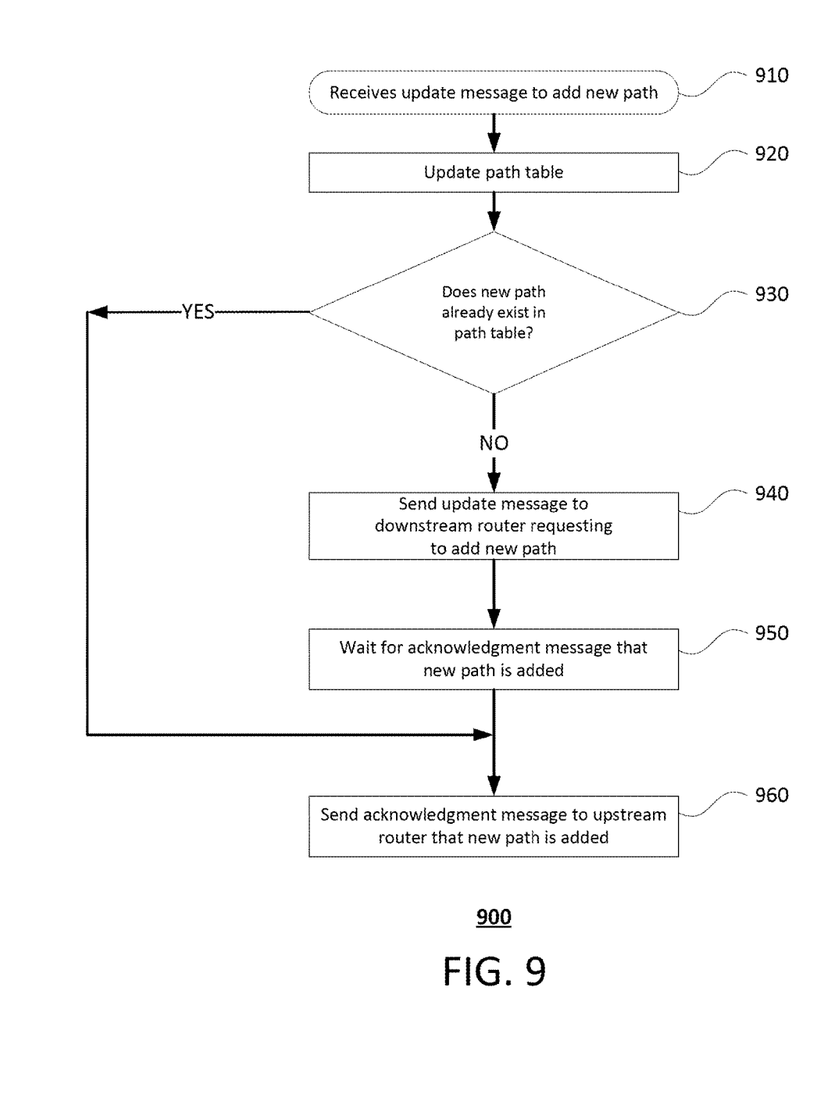
FIG. 9 is an example flow diagram of a synchronized route update during link activation in accordance with aspects of the disclosure.

FIG. 9 is an example flow diagram 900 of the synchronized route update from the perspective of the next-hop router in FIG. 8. At block 910, the next-hop router receives the update message requesting it to add the new path, as noted in block 820. Upon receiving this update message, the next-hop router at block 920 updates its path table to reflect the new path.

At block 930, the next-hop router determines whether the new path already exists as an entry in its path table. If the next-hop router determines that the new path already exists, it sends its own acknowledgement message back to the original upstream router that it has added the new path to its path table at block 960.

If the next-hop router determines that the new path does not already exist as an entry in its path table at block 930, then it sends an update message to its immediate downstream router requesting it to add the new path to its path table at block 940. At block 950, the next-hop router waits for an acknowledgement from the downstream router that it has added the new path. Upon receiving this acknowledgment message, the next-hop router sends its own acknowledgment message back to the original router that it has added the new path at block 960.

For FIGS. 3-9 described above, the processes and procedures performed by the routers at the various blocks may also be performed by the centralized controller depicted 170 in FIG. 1. By way of example only, the centralized controller 170 may track and update the path tables and associated flow rules for each router of a network during link shutdown or link activation events. Similarly, the centralized controller 170 may also perform synchronized route updates for these events.

The above-described aspects of the disclosure may be advantageous in that one or more routers of a network may communicate with and inform each other using their respective path tables about any imminent and/or planned topology change that may occur on the network in order to preemptively reroute traffic paths that may be affected by the change. In this regard, traffic loss that would occur by not rerouting the traffic paths affected by the topology change may be prevented, and ultimately, network throughput may be maintained.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. The examples and other arrangements may be devised without departing from the spirit and scope of the subject matter defined by the appended claims. Further, the same reference numbers in different drawings can identify the same or similar elements.

The invention claimed is:

1. A method comprising:

receiving, with one or more computing devices, a notification of a planned topology change, the planned topology change affecting a link between a plurality of network nodes on a network, wherein the planned topology change includes adding a new link to the network;

determining, with the one or more computing devices, in response to receiving the notification of the planned topology change, one or more network paths that include the affected link;

determining, with the one or more computing devices, one or more user nodes associated with each of the one or more network paths;

sending, with the one or more computing devices, an instruction message with information about the planned topology change to the determined one or more user nodes associated with each of the one or more network paths;

receiving, with the one or more computing devices, an acknowledgment message from each of the determined one or more user nodes in response to the instruction message, the acknowledgement message including information indicating at least one of whether the respective user node still has traffic to send over the affected link, or whether the respective user node has updated its path table;

determining, based on the information in the received acknowledgement message, with the one or more computing devices, whether to effect the planned topology change;

when the information in the acknowledgement message indicates that the determined one or more user nodes still has traffic to send over the affected link, deciding, by the one or more computing devices, not to effect the planned topology change for at least a predetermined period of time;

when the information in the acknowledgement message indicates that all of the user nodes have updated their path tables, effecting the planned topology change; and wherein the information in the acknowledgement message indicates that the determined one or more user nodes still has traffic to send over the affected link, waiting the predetermined period of time before sending, with the one or more computing devices, a second instruction message or effecting the planned topology change.

2. The method of claim 1, further comprising maintaining a path table including the one or more network paths associated with the affected link and the one or more user nodes associated with the one or more network paths.

3. The method of claim 2, further comprising:
effecting the planned topology change; and
updating the path table in response to the effected topology change.

4. The method of claim 1, wherein the planned topology change includes shutting down the affected link.

5. The method of claim 4, wherein the instruction message includes a request to delete a path when the topology change is shutting down the affected link, or a request to add a path when the topology change is adding the new link.

6. The method of claim 1, wherein the one or more computing devices includes at least one of a router and a centralized controller.

7. A system comprising:
memory;
one or more computing devices, each of the one or more computing devices having one or more processors coupled to the memory;
wherein the one or more computing devices is configured to:
receive a notification of a planned topology change, the planned topology change affecting a link between a plurality of network nodes on a network, wherein the planned topology change includes adding a new link to the network;
determine, in response to receiving the notification of the planned topology change, one or more network paths that include the affected link;
determine one or more user nodes associated with each of the one or more network paths;
send an instruction message with information about the planned topology change to the determined one or more user nodes associated with each of the one or more network paths;
receive an acknowledgment message from each of the determined one or more user nodes in response to the instruction message, the acknowledgement message including information indicating at least one of whether the respective user node still has traffic to send over the affected link, or whether the respective user node has updated its path table;
determine, based on the information in the received acknowledgement message, whether to effect the planned topology change;
when the information in the acknowledgement message indicates that the determined one or more user nodes still has traffic to send over the affected link, decide not to effect the planned topology change for at least a predetermined period of time;

when the information in the acknowledgement message indicates that all of the user nodes have updated their path tables, effect the planned topology change; and wherein the information in the acknowledgement message indicates that the determined one or more user nodes still has traffic to send over the affected link, wait the predetermined period of time before sending, with the one or more computing devices, a second instruction message or effecting the planned topology change.

8. The system of claim 7, wherein the one or more computing devices is configured to maintain a path table stored in the memory, the path table includes the one or more network paths associated with the affected link and the one or more user nodes associated with the one or more network paths.

9. The system of claim 8, wherein the one or more computing devices is further configured to:
effect the planned topology change; and
update the path table in response to the effected topology change.

10. The system of claim 7, wherein the planned topology change includes shutting down the affected link.

11. The system of claim 10, wherein the instruction message includes a request to delete a path when the topology change is shutting down the affected link, or a request to add a path when the topology change is adding the new link.

12. The system of claim 7, wherein the one or more computing devices includes at least one of a router and a centralized controller.

13. A non-transitory, tangible computer-readable medium on which instructions are stored, the instructions, when executed by one or more computing devices perform a method, the method comprising:
receiving a notification of a planned topology change, the planned topology change affecting a link between a plurality of network nodes on a network, wherein the planned topology change includes adding a new link to the network;
determining, in response to receiving the notification of the planned topology change, one or more network paths that include the affected link;
determining one or more user nodes associated with each of the one or more network paths;
sending an instruction message with information about the planned topology change to the determined one or more user nodes associated with each of the one or more network paths_;
receiving an acknowledgment message from each of the determined one or more user nodes in response to the instruction message, the acknowledgement message including information indicating at least one of whether the respective user node still has traffic to send over the affected link, or whether the respective user node has updated its path table;
determining, based on the information in the received acknowledgement message, whether to effect the planned topology change;
when the information in the acknowledgement message indicates that the determined one or more user nodes still has traffic to send over the affected link, deciding not to effect the planned topology change for at least a predetermined period of time;

when the information in the acknowledgement message indicates that all of the one or more user nodes have updated their path tables, effecting the planned topology change; and wherein the information in the acknowledgement message indicates that the determined one or more user nodes still has traffic to send over the affected link, waiting the predetermined period of time before sending, with the one or more computing devices, a second instruction message or effecting the planned topology change.

14. The non-transitory, tangible computer-readable medium of claim 13, the method further comprising maintaining a path table including the one or more network paths associated with the affected link and the one or more users nodes associated with the one or more network paths.

15. The non-transitory, tangible computer-readable medium of claim 14, the method further comprising:
effecting the planned topology change; and
updating the path table in response to the effected topology change.

16. The method of claim 1, comprising sending, by at least one of the one or more computing devices, a request message to another computing device coupled to the network requesting addition of a new path between the at least one computing device and a destination for the end-to-end network traffic.

17. The method of claim 16, comprising sending the request message before the at least one computing device modify data rules associated with a path table of the at least one computing device.

* * * * *